United States Patent [19]

Cummings

[11] 4,075,527

[45] Feb. 21, 1978

[54] X-RAY DETECTOR

[75] Inventor: Harold R. Cummings, Waukesha, Wis.

[73] Assignee: General Electric Company, Milwaukee, Wis.

[21] Appl. No.: 727,260

[22] Filed: Sept. 27, 1976

[51] Int. Cl.$^2$ .......................... B32B 31/20; H01J 1/90; H01J 39/26

[52] U.S. Cl. ...................................... 313/93; 156/295; 156/330; 313/268

[58] Field of Search .................. 313/93, 268; 156/330, 156/295, 311

[56] References Cited

U.S. PATENT DOCUMENTS

| | | | |
|---|---|---|---|
| 2,566,684 | 9/1951 | Tobias | 313/93 X |
| 2,992,954 | 7/1961 | Nelson et al. | 156/330 X |
| 3,654,469 | 4/1972 | Kantor | 313/93 X |
| 3,996,092 | 12/1976 | Sarazin et al. | 156/330 X |

*Primary Examiner*—Palmer C. Demeo
*Attorney, Agent, or Firm*—Ralph G. Hohenfeldt

[57] ABSTRACT

An improved x-ray or other ionizing radiation detector comprises an array of adjacent cells comprised of alternately disposed oppositely polarized electrodes and guard electrodes and insulators between them. Means are provided for maintaining uniform and accurate dimensions between electrodes and the overall length of the array.

23 Claims, 17 Drawing Figures

X-RAY DETECTOR

BACKGROUND OF THE INVENTION

This invention relates to detectors of ionizing radiation such as x-ray and gamma radiation. More specifically, the invention is concerned with improving multicell detectors which have various uses but are especially useful in computed tomography systems.

In the computed tomography process, a spatial distribution of x-ray photon intensities emerging from a body under examination is translated into electric signals which are processed in such manner that the image may be reconstructed and displayed. Background information on the process is given in an article by Gordon et al, "Image Reconstruction From Projections", Scientific American, October 1975, Vol. 233, No. 4. Detectors used in computed tomography must detect x-ray photons efficiently and with a high degree of spatial resolution. In some tomography systems, the x-ray source is pulsed and the pulse repetition rate can be limited by the recovery time of the x-ray detectors. It is desirable, therefore, to use x-ray detectors which have fast recovery time, high sensitivity, and fine spatial resolution. In some computed tomography systems, the x-ray beam has a fan shape and diverges as it exits from the examination subject whereupon the beam falls on an array of detector cells such that photon intensities over the leading front of the beam can be detected and resolved spatially. The individual detector cells are arranged in a stack or array so that x-ray photons distributed across the beam may be detected simultaneously.

In order to get good spatial resolution, it is desirable to have the electrode plates which comprise each cell spaced closely and uniformly over the entire length of the detector array. One prior attempt at achieving uniform and precise dimensions involves attaching alternate electrode plates to their connectors as one means of support and letting another portion of each of them bear on insulating supports. This method requires careful gauging of the distance between electrodes during assembly of the detector but there is still no assurance that the electrode plates will not be misaligned or distorted so as to upset the uniform distance between electrodes in the final assembly.

SUMMARY OF THE INVENTION

Basically, the ionizing radiation detector herein described comprises a chamber in which many discrete detector cells are arranged or stacked adjacent each other. The chamber is filled with a high atomic weight gas at high pressure. X-ray photons which penetrate a window in the chamber interact with the gas to produce photoelectron-ion pairs in the presence of an electric field. The electrons and positive ions resulting from interaction of x-ray photons and the gas drift along electric field lines are collected on the positive and negative electrodes, respectively. The resulting electric currents are proportional to the x-ray photon intensity between opposite polarity electrodes which comprise a cell. The electron-ion pairs must be collected and removed from the detector before the next x-ray exposure in order to produce unambiguous data.

Important features of the improved detector are the manner in which the spacing between the planar electrodes of each cell and the dimensions of the array of cells are maintained. The problem of maintaining accurate dimensions arises as a result of the thicknesses of the plate electrodes varying by a very small but significant amount. For instance, even though all of the electrodes are stamped from the same sheet or cut from the same strip their thicknesses may vary by part of a thousandth of an inch or even more. The insulators between electrodes may also vary by a small amount in thickness. A detector array or stack may comprise hundreds of juxtaposed electrode plates and separating insulators which, if their thickness errors are cumulative could result in a substantial variation in the overall length of the detector. This can be appreciated by realizing that detectors of the type here under consideration may comprise hundreds of individual cells and the array may be on the order of 30 inches long. Dimensional errors could result in the array fitting too loosely or too tightly or even not fitting at all into the chamber. The problem of establishing proper dimensions between electrodes is made more necessary by the fact that the plate electrodes are usually angulated and may even be curved such that impinging x-ray photons from the x-ray beam must enter the detector array in substantial parallelism with the electrodes to avoid photons striking and being absorbed by the electrodes before they penetrate the gas filled gap between them.

In accordance with one feature of the invention, uniform spacing and close control of the angles between electrodes and close control of the dimensions of the entire array is achieved by depositing viscous resinous material or adhesive at selected locations between the electrodes and insulators during assembly. Groups of cells or subassemblies are formed in this manner by assembling the electrode elements and insulators in proper sequence in a form or die which has a radius of curvature, either finite or infinite, conforming with that desired for the detector array. The subassemblies are baked to cure and solidify the adhesive and maintain the pieces as a unit. Subassemblies are then joined to others with similar adhesive to form the entire detector array. The whole assembly is then heat cured and becomes a unit which can be mounted in the gas filled hollow body of the detector assembly.

The configuration of the electrodes is such that the active electrodes, such as the anode and cathode electrodes, can be supported in electrical isolation from the chamber. The electrodes are also shaped so that those which operate at ground potential may contact the chamber or body wall and provide support for the entire array.

It will be evident from the foregoing that one of the objects of this invention is to provide a method and means for fabricating a multi-cell detector so that close control may be maintained over spacing and angulation of the components in each cell and over the dimensions of an array of cells. This object is achieved primarily by assembling the components with a viscous yieldable adhesive between them as mentioned above.

Another object is to simplify and reduce the assembly time for fabricating a multi-cell detector.

Still another object is to provide a high pressure, ionization chamber type of x-ray detector having high spatial resolution.

Yet another object is to provide a multi-cell detector which enables detecting discrete and unambiguous bits of x-ray photon intensity information throughout its length.

A further object is to simplify the support for the active elements of the detector.

Another object of this invention is to provide a multi-cell x-ray detector which is especially suitable for use in high speed, computed x-ray tomography systems.

How the foregoing and other more specific objects of the invention are achieved will be evident in the ensuing description of an illustrative embodiment of the invention in which reference to the drawings will be made.

DESCRIPTION OF A PREFERRED EMBODIMENT

Figure 1:
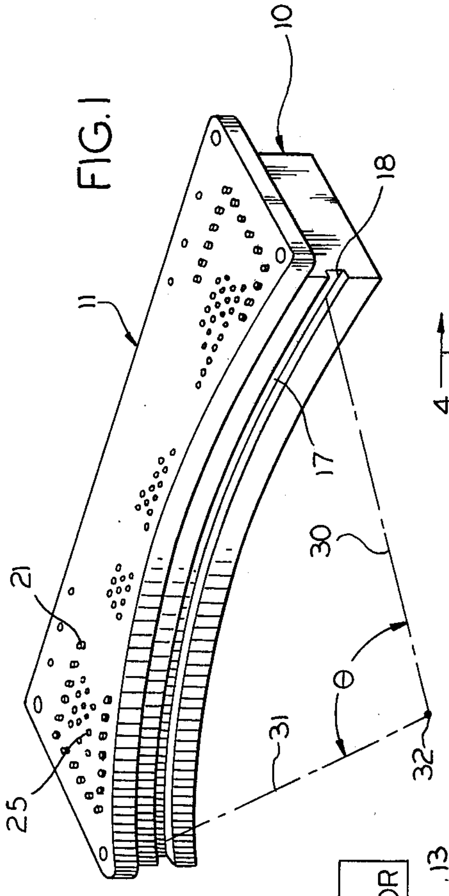
FIG. 1 is a perspective view of an assembled multi-cell detector which incorporates the features of the invention.
Figure 4:
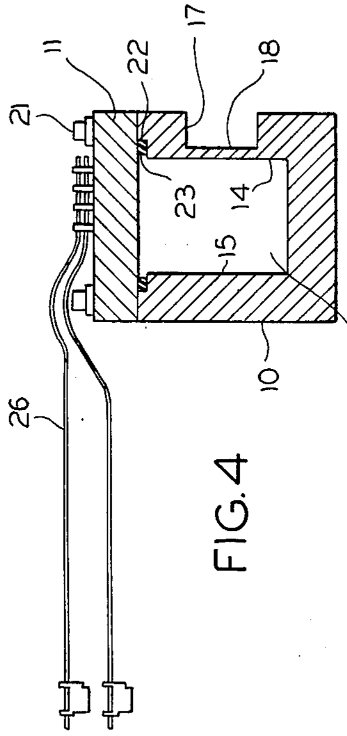
FIG. 4 is a section taken on a plane corresponding with 4—4 in FIG. 2 but with internal parts of the assembly omitted to illustrate the configuration of the interior.

FIG. 1 is a perspective view of a detector incorporating the features of the invention as it appears before its electric leads are connected. Two major parts of the detector are the body 10 and cover or base 11. The active elements of the detector array are supported on the base 11 as will be explained. Body 10 is desirably aluminum which is formed with front and rear curvatures indicated by the solid line 12 and the hidden line 13 in FIG. 2. The chamber body 11 has an interior curved cavity or channel 16 having a front wall indicated by the dashed line 14 in FIG. 2 and a rear wall indicated by the dashed line 15. The cross-sectional shape of the channel in body 10 can be seen in FIG. 4 where it is marked 16 and in which the internal parts that are normally suspended from cover 11 are omitted for the sake of clarity. Body 10 has a groove 17 milled in its front wall such that, as can be seen in FIG. 4 particularly well, a thin portion of the wall remains and serves as an x-ray permeable window 18.

Figure 2:
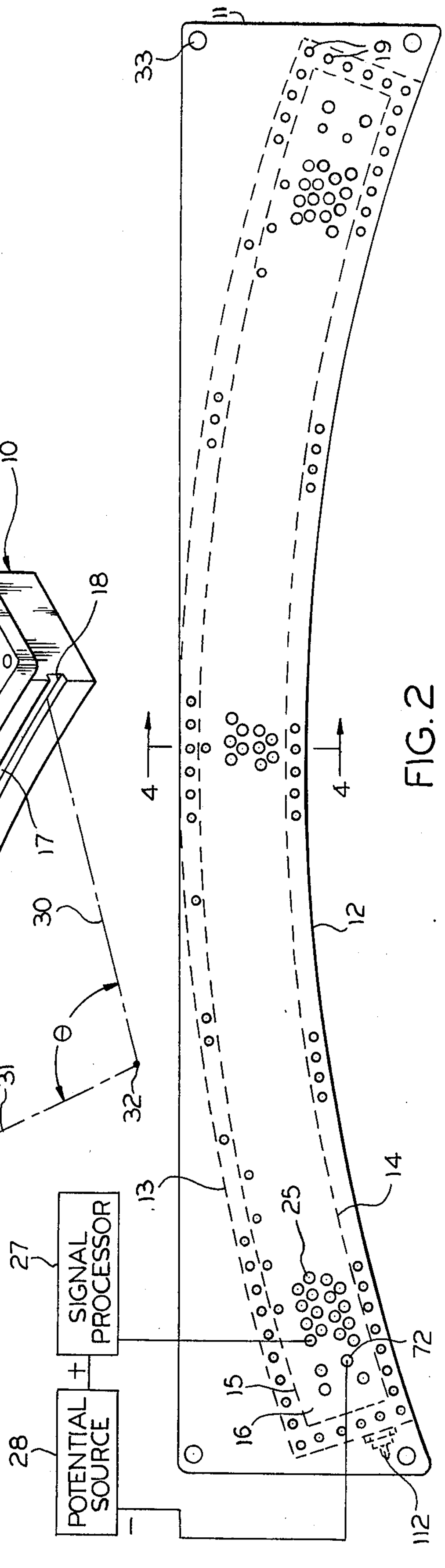
FIG. 2 is a plan view of the detector assembly associated with an external illustrative signal processing system which is shown in block form.

The upper face or open end of body 10 is provided with a plurality of closely spaced threaded holes such as those marked 19 in FIG. 2. Base 11 has a plurality of congruent holes 20, see FIG. 5, through which socket headed cap screws 21 pass as shown in FIG. 1 to enable clamping base 11 to body 10 in a leakproof manner. As can be seen in FIG. 4, the upper surface of body 10 has a shoulder 22 milled on it for the purpose of accommodating an o-ring gasket 23 which is preferably made of soft copper wire formed as a closed loop. The thicknesses of the body 10 walls and base 11 and the window 18 must be great enough to withstand high gas pressures.

The detector is filled with a high atomic weight gas which is ionizable by x-ray photons having energies in the ranges used in computed tomography systems. High atomic weight elemental or molecular gases which are not subject to decomposition by x-radiation may be used. In a commercial embodiment of the detector, xenon at 25 or more atmospheres of pressure is used.

Figure 11:
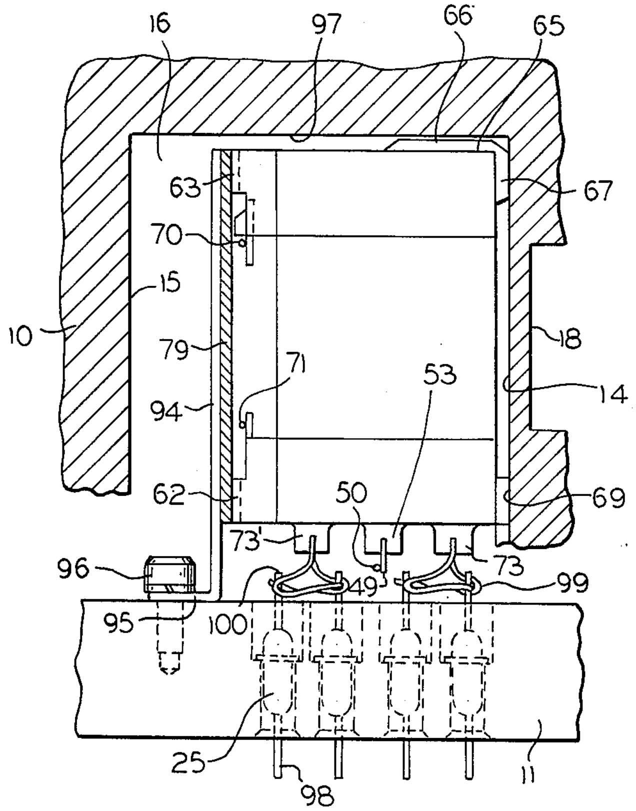
FIG. 11 is a side view of the cells as they appear when disposed in the boxlike body or chamber.
Figure 13:
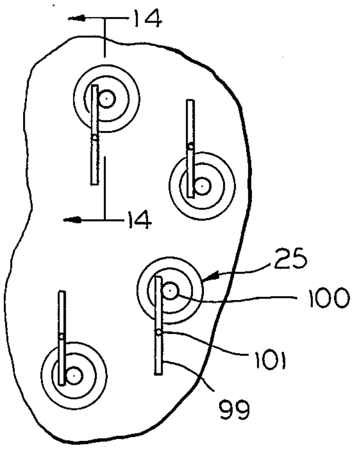
FIG. 13 is an enlargement of one of the lead-throughs.
Figure 14:
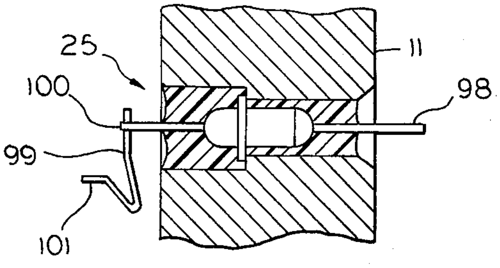
FIG. 14 is a section through a lead-through corresponding with the lines 14—14 in FIG. 13.

Extending through base 11 are a plurality of electric leadthroughs 25, some of which are shown in FIGS. 1 and 2 and which can be seen in greater detail in FIGS. 11, 13 and 14. Most of the lead-throughs are connected to electrodes of one polarity in the cells such as to anodes or signal collecting electrodes. It will be understood however that alternate electrodes may be either anodes or cathodes. In the illustrated embodiment, there is a lead-through connected to each anode by a wire such as the one marked 26 in FIG. 2 and all of these wires lead to a signal processor 27. The processor is supplied from a potential source 28. All of the negative electrodes or cathodes, in this example, may be connected together with a common wire, to be described, and in turn connected to a conductor 29 which leads back to the negative terminal of the potential source 28.

In FIG. 1, the boundaries of the fan-shaped x-ray beam are marked 30 and 31 and are seen to diverge from an x-ray spot source which would be located at about the point 32. The angle between boundary rays 30 and 31 is marked $\theta$. A human body, not shown, being subjected to x-ray examination by scanning with the fan-shaped beam would lie within boundary rays 30 and 31 between source 32 and window 18 of the detector. Thus, it will be seen that the detector must sense the photon intensity distribution corresponding with penetration of the rays through a matrix of body elements at every instant.

The terms up, down, front, rear and the like are used herein to facilitate relating the description to the drawings but it will be understood that the detector can be used in any orientation. The detector may be mounted by using the bolt holes 33 which are in the corners of the base 11.

Figure 10:
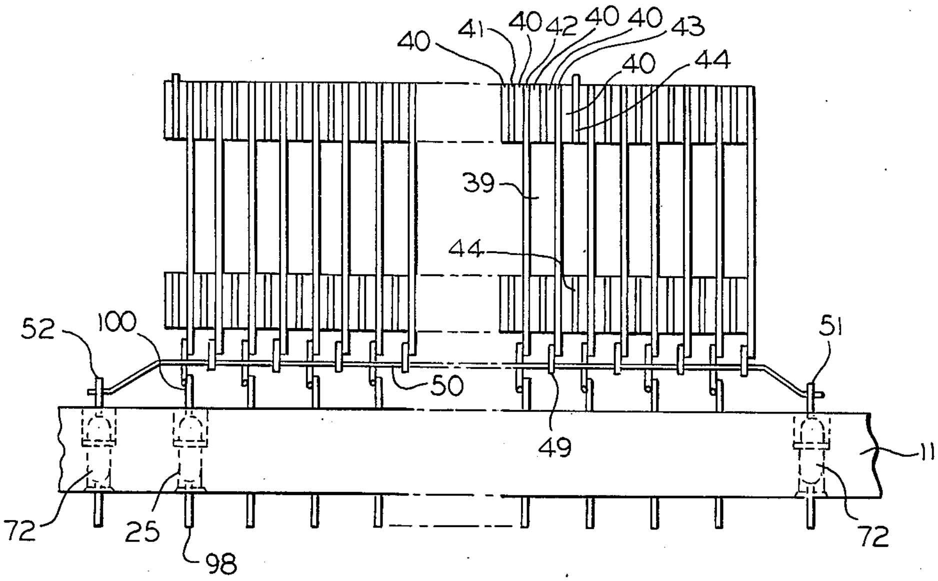
FIG. 10 is a front view of a plurality of detector cells.

The new construction and method of assembly of the multicell detector array will now be described in greater detail. Refer to FIG. 10 where the cells are shown in sufficient size to make identification of their parts easy. The parts are arranged in a repetitive fashion. The cells are comprised of first, second and third electrode plate types and plate insulators. For instance, at any given portion along the length of the cell array there will be repeating sequences of elements such as a glass plate or insulating separator 40, a guard electrode comprised of a metal plate 41, another glass insulating plate 40, an active or signal collecting electrode plate 42, a glass plate 40, another guard electrode plate 41, a glass plate 40, a bias electrode plate 43, a glass plate 40, another guard electrode 48 of a different shape than 41 type, and so forth. All of the bias electrodes such as 43, which are centered between pairs of signal electrodes such as 42, are connected by means of stub leads 49 to a common conductor 50. This conductor is connected at its opposite ends to lead-through wires 51 and 52, respectively, and these lead-throughs are connected in common to the negative side of the potential source 28 in this example. Each signal collecting electrode or anode plate 42 is connected to an individual lead-through such as 25 in FIG. 10 and all of them are led to the signal processor 27 as is suggested in FIG. 2 by the plurality of stub leads extending from the signal processor.

Referring further to FIG. 10, it will be appreciated that the edges of signal electrodes 42 and bias electrode 43 nearest to the observer are immediately behind x-ray window 18 when the detector array is disposed in body 10. X-ray photons coming in along discrete paths after passing through window 18 will enter the gap 39 between a signal collecting plate 42 and a bias electrode plate 43 comprising a cell. Thus, photons will pass through the gas filled gap 39 of a cell and ionize the gas therein in accordance with the quantity and energy of the photons. Electrons from the ion pairs so produced will be attracted to the signal electrodes or anodes 42 and positive ions will be attracted to the bias electrodes or cathodes 43 to thereby produce discrete electric signals which are a measure of the intensities of the x-ray photons emerging from many small areas of a body being examined. It will be appreciated by those skilled in the art that polarity on the bias electrodes 43 and signal electrodes 42 may be reversed so that the bias electrodes become positive and collect the electrons and the presently called signal electrodes become negative to discharge the ions.

The manner in which the parts are assembled to produce cells and subassemblies of cells and assemblies of the subassemblies constituting the whole array of detector cells will now be described in greater detail in reference to FIGS. 7–10. First refer to FIG. 9 where the parts are shown and arranged in a manner that will facilitate explanation of how they are assembled in this embodiment. Recognize initially that the bias electrode or cathode plates 43 and the signal electrode plates or anodes 42 are thin sheets of metal which may have manufacturing thickness variations on the order of 10% of their thickness. The guard electrodes, preferably made of stainless steel sheets also may vary in thickness by a similar amount. The glass insulating separators 40 typically have a thickness of under .015 inch and may vary by a few percent. The bias electrodes 43 and signal electrodes 42 are preferably made of a high atomic number metal such as tungsten to reduce transmission of primary and secondary x-ray photons between cells so the detected photons and signals in each cell will be more discrete. It will be evident that if each of the electrode and insulating elements in FIG. 9 has some thickness variation, a substantial error could occur between cells and in the overall length of the detector array when they are finally assembled. The novel manner in which the cells are formed into the array using viscous adhesive, however, precludes such errors.

Figure 9:
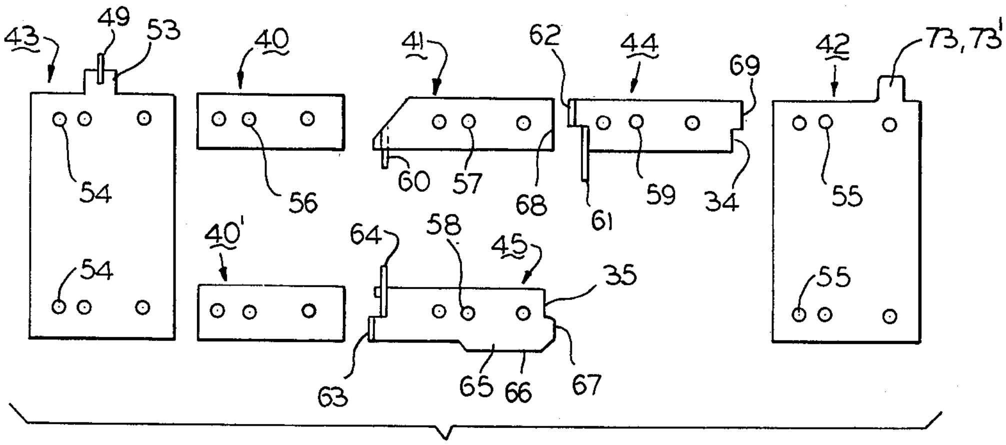
FIG. 9 shows the configuration of parts which comprise a detector cell.

Consider the assembly process in reference to FIG. 9. Note first that prior to assembly, the parts have several deposits, herein called dots of viscous heat curable adhesive such as an epoxy resin on them. For instance, there are six dots 54 shown on bias electrode 43. There are similarly six dots 55 on signal electrodes 42. The insulating glass plates 40 have three dots marked 56. One type of guard electrode 41 has three dots marked 57. Another type of guard electrode 45 which also serves as a support for the detector cells as will be explained, has three dots of viscous adhesive marked 58. Still another type of guard electrode 44, which also serves as a support, has three dots marked 59. The viscosity of the adhesive material before curing is such that if one of the elements in FIG. 9 is simply placed upon the other, the elements will be spaced apart and have a gap between them corresponding essentially with the thickness of the viscous material dots. But when a stack of the parts is placed together and pressed, the viscous material will flow and allow the parts to yield toward each other until the desired overall thickness of the stack is attained in which case adjacent portions of the plates to which the adhesive was applied will be nominally contacting each other. After curing, of course, the adhesive sets and the parts are held at their desired angulation and spacing. The number of adhesive dots deposited is somewhat arbitrary. Depositing the dots of adhesive by dipping rods, not shown in adhesive and then pressing the tips of the rods on the parts when they are laid out for assembly is a convenient way of controlling the amount of adhesive deposited. Using so much that there is oozing at the edges is undesirable. At least enough adhesive must be used to compensate for thickness variations in the electrodes and insulators when the cells comprising a subassembly and the series of subassemblies are placed under compression to establish the proper thickness before the adhesive is set.

Fabrication of the cells to form a subassembly of cells will be described in reference to FIG. 9. The cells are assembled in a suitable jig, described later, which has a curved channel agreeing in curvature with channel 16 in body 11 and of the proper width for accommodating the pieces and having the proper radius for conforming with the direction of the rays of the fanshaped beam. In cases where a straight detector is desired for detecting parallel rays, the channel would not be curved and the plates would not be angulated.

Construction of a cell progresses by placing a bias electrode 43 in the jig with the viscous resin dots 54 on the forward side. Then a pair of glass insulator plates 40 are set on the bias electrode near its upper and lower margins, respectively. The viscous resin dots 56 of the glass insulators are on their exposed side at this time. Next a pair of guard electrodes such as 41 are placed on the glass insulators with the dots 57 of the guard electrodes on the front side. Each guard electrode of the type marked 41 has a lead wire 60 spot welded to it. Thus, one of the guard electrodes 41 will be stacked so its lead wire 60 extends downwardly as shown and, the other, which is similar will be inverted and have its dots on the front side and its lead wire 60 extending upwardly. Next, another pair of glass electrodes with their dots up are deposited on the guard electrodes. Then a signal electrode 42 is deposited on the last named glass electrodes with the dots 55 faced upwardly. The sequence continues with placing a pair of glass insulators on signal electrode 42, then a pair of guard electrodes, and another pair of glass insulators, then a bias electrode, and so forth. Note that signal electrodes 42 are formed with a tab that is marked 73 and 73' in FIGS. 8 and 9. As the consecutive cells are assembled, every other electrode 42 is reversed to place the tabs 73 and 73' at the front and rear as can be seen in FIG. 8.

Periodically, such as when every eighth cell is assembled, guard electrodes of the special type marked 44 and the type marked 45 are inserted in pairs. These guard electrodes serve to support the detector array at intervals along its length. For this purpose the guard electrode of the type marked 44 has a right angularly bent portion forming a foot 62 which can be spot welded to a supporting plate, to be described later. Guard electrode 44 also has a lead wire 61 spot welded to it. The lead wire extends downwardly as shown. Guard electrodes of the type marked 44 are used as one of a pair with guard electrodes of the type marked 45. In other words, these types are in the same layer. Guard electrode 45 also has a right angularly bent flat foot 63 and an upwardly extending lead wire 64 spot welded to it. Guard electrode 45 also has an extension 65 whose edge 66 bears on the wall of the curved channel 16 in housing or body 10 to provide support for the detector array as can be seen in FIG. 11. The front edge 67 of guard electrode 45 also bears against the front wall 14 of channel 16 to provide further support for the assemblage of cells and to maintain the edges of the bias and signal electrodes in fixed relation with the bottom of the housing and the wall in which window 18 is located. The leading edge 68 of guard electrode 41 serves the same purpose since it also contacts or bears on wall 14 of the array containing channel 16. Guards 44 and 45 have notches 34 and 35, discussed later.

When a subassembly comprising about 20 cells or some other arbitrary number is fabricated, the stack may be compressed in the jig in which case the viscous resin will cold-flow and allow the stack to attain the desired thickness and angles in accordance with the specifications. The resin thereby permits adjustment for thickness variations in the individual pieces or electrodes comprising the stack. The subassembly may then be heat cured in an oven while it remains in the jig. When removed from the oven, it will have the desired dimensions for being juxtaposed and joined with other subassemblies to form the entire detector array having whatever total length and curvature and number of cells that is desired. It should be mentioned that the subassemblies have viscous adhesive applied to their ends before they are clamped in a common jig for curing. A self-curing adhesive can be used in place of the heat-curable type suggested above. This will obviate the heating or baking steps but self-curing adhesives and resins having proper viscosity set more slowly and delay production.

Figure 8:
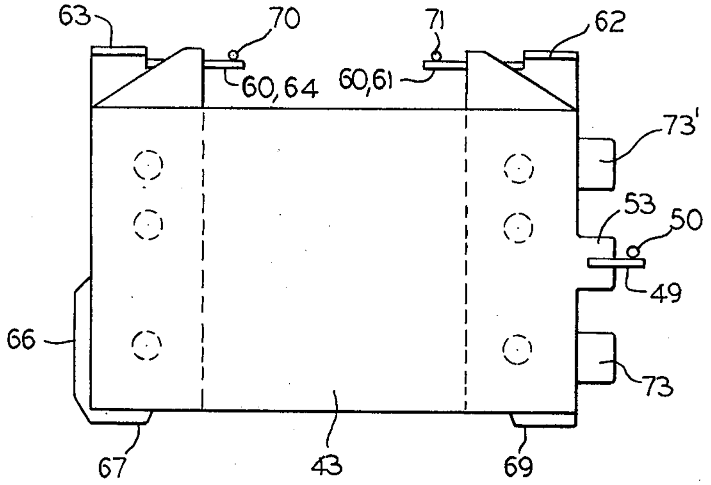
FIG. 8 is a side view of a subassembly of cells.

An end view of a solidly bonded array of individual cells formed in an arc is depicted in FIG. 8. Note that the front edges 66, 67 and 69 of certain of the guard electrodes protrude beyond the edges of the congruent bias and signal electrodes 43 and 42. This is for stabilizing the array body 10 as mentioned earlier. The guard electrodes with protrusions on one end also have the supporting feet 63 and 62. All electrodes have upwardly extending lead wires such as 60, 64 and downwardly extending lead wires such as 60, 61 which are in alignment with each other so they cannot be distinguished in FIG. 8. One set of guard electrode leads 60, 64 in FIG. 8 are connected to a common conductor 70 and the other set 60, 61 are connected to a common conductor 71. Conductors 70 and 71 leading from the guard electrodes may be connected to ground in any desired fashion.

In FIG. 8 all of the leads 49 which are spot welded to the bias electrodes 43 are connected to a common conductor 50 and, after passing through a lead-through 72, see FIG. 2, a connection can be made by means of conductor 29 to potential source 28. As mentioned earlier in reference to FIG. 8 the signal electrodes 42 are stacked so their extensions or tabs 73 and 73' are alternately to the left and right or front and rear and this facilitates connecting these tabs to their individual lead-throughs since more clearance is allowed between them by this arrangement.

Attention is now invited primarily to FIGS. 5, 6, 7 and 11. As has been explained, a plurality of cells comprising bias electrodes 43, guard electrodes 41, combined guard and support electrodes 44, 45, signal collecting electrode 42 with alternating glass plates 40 between them are stacked to form a subassembly which may be called a block. These blocks are typified by the three which are marked 80, 81 and 82 in FIG. 6. Lines marked 83–86 in FIG. 7 indicate where the blocks interface but it will be understood that in the final assembly the array of individual cells is unitary across its entire length. In the final assembly, when a number of blocks such as 80–82 are juxtaposed, viscous adhesive is also deposited at the interfaces such as 83–86. What might be considered a plan view of an enlargement of one of the blocks or subassemblies may be seen in FIG. 7. Note that the guard electrodes 44 and 45 which are also used to support the assembly of cells have the support feet 62 extending from them. These feet are spot welded to a curved metal backing plate 79 which can be seen in FIGS. 5–7. In the final assembly, see FIGS. 5, 6 and 11 in particular, one may see that the plate or band 79 is in turn spot welded to a series of brackets 94 which have right angularly bent feet 95. These feet 95 have holes in them for anchoring them to the cover or base 11 of the detector assembly with a plurality of socket headed cap screws 96. Thus, the entire detector cell array is fastened to cover or base 11. When the array is deposited in the curved channel 16 of body 10, see FIG. 11, it will be evident that further support and guidance of the array is obtained by the edges 66 and 67 of the guard electrodes butting one inner surface 97 of channel 16 and another edge 67 butting inner surface 14 of channel 16.

Figure 6:
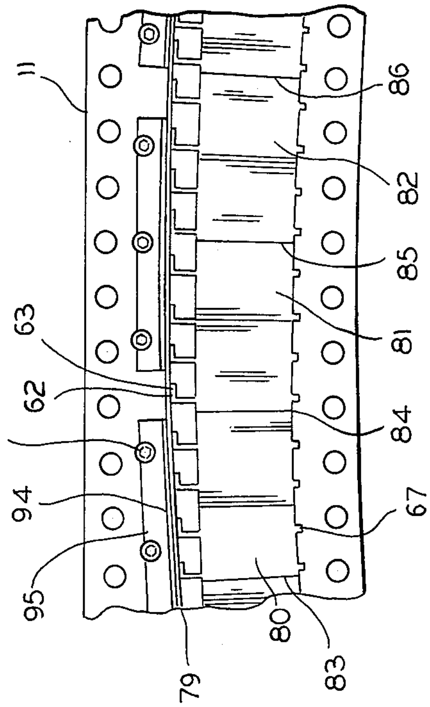
FIG. 6 is an enlarged fragmentary portion of the assembly shown in FIG. 5.
Figure 7:
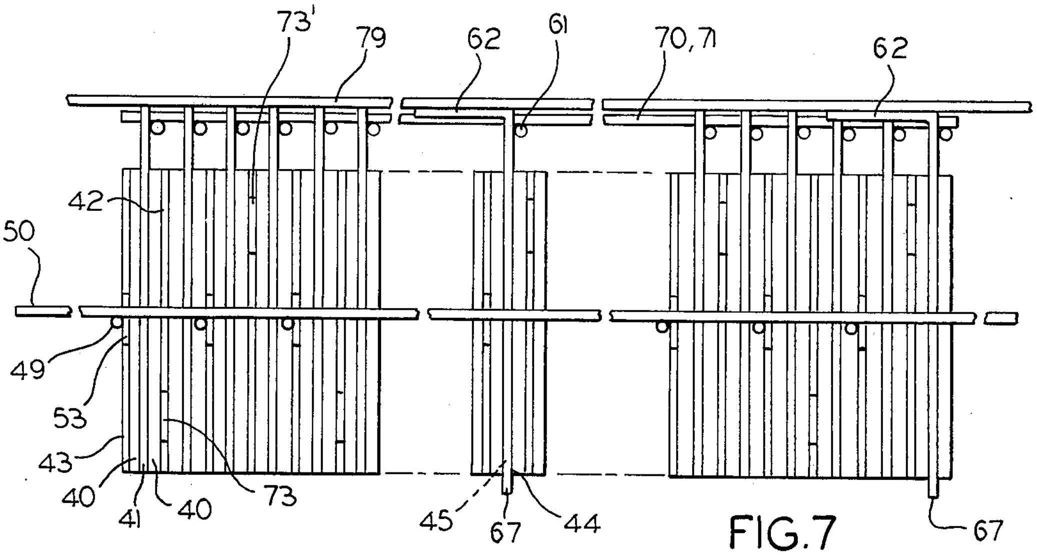
FIG. 7 is an enlarged portion of the multi-cell array as viewed from the side over which the cover or base is disposed, with said base being omitted.

As explained earlier, the subassemblies of cells or blocks such as 80-82 in FIG. 6 are formed individually in a curved form or die and the viscous adhesive is deposited between each layer as the subassembly is formed. The subassemblies are then pressed so that all of the electrode plates and insulators between them lie on radii extending from a common point such as the x-ray focal spot 32 in FIG. 1. During the pressing operation, as has been described, the viscous adhesive flows and allows the pieces to adjust to the proper radius and spacing. Curing and solidifying the adhesive maintains the spacing and radius fixed.

Figure 5:
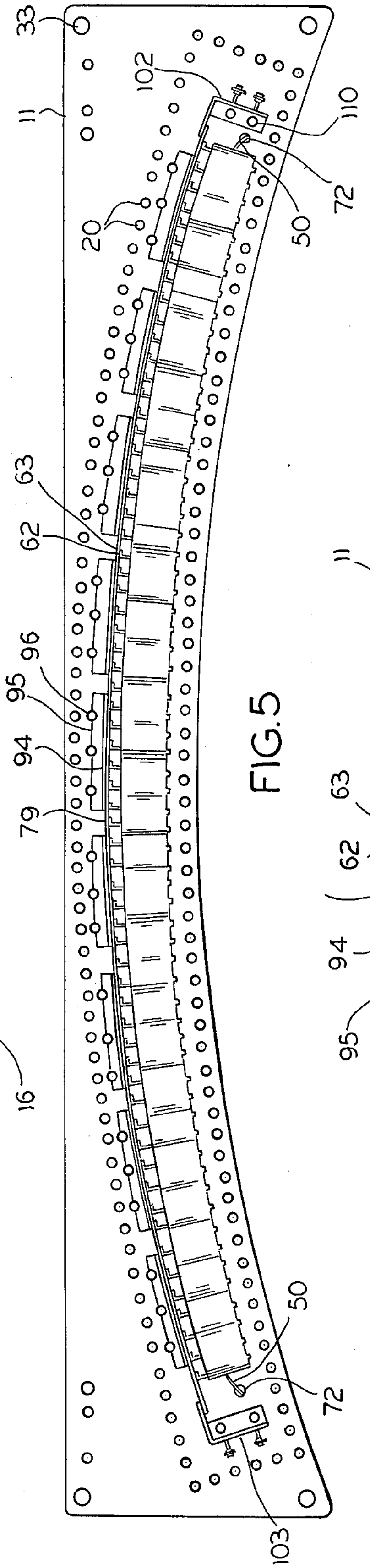
FIG. 5 is a bottom or inverted view of the detector cover or base to show how the multiple detector cells are arranged and supported from the base.

The number of blocks or subassemblies similar to 80-82 for making up the overall length of the detector array such as is shown in FIG. 5 is, after the subassemblies are cured, assembled in a form or die, not shown. During this step, viscous adhesive is also deposited at the interfaces of the subassemblies so that when they are subjected to endwise compression in the die, the viscous adhesive will flow and permit the desired overall length of the array to be attained. The juxtaposed subassemblies are then baked while in the die to cure and solidify the adhesive between them. Following this step, the feet 62 and 63 of the guard electrodes are spot welded to support band or strip 79 as explained above. Then the brackets 94 are spot welded to backing strip 79 and the array is ready for being fastened to base 11 with screws 96.

Prior to mounting of the array on base 11, all of the stub leads 49 which are spot welded to bias electrodes 43 may be spot welded to the common lead 50 so its opposite ends may be connected to the lead-throughs 72 in base 11.

The tabs 73 and 73' extending from the signal electrodes 42 are connected to lead-throughs 25 after the array is mounted with the use of brackets 94. One of the lead-throughs 25 is shown in FIG. 14 in a section of the cover or base 11. All of the outside ends of the central lead-through 25 conductors 98 connect by means of conductors similar to 26 to the various inputs of the signal processor 27 in FIG. 2. Small shaped wires 99 are spot welded to the inner ends 100 of the lead-through conductors. The remote ends 101 of the small wires are then connected by means of spot welding to tabs 73 and 73' extending from signal electrodes 42. Note in FIG. 14 that the feed through 25 and lead wires 101 running from them are staggered on base 11 to facilitate making connections between the electrodes of the cells and the lead-throughs.

Figure 12:
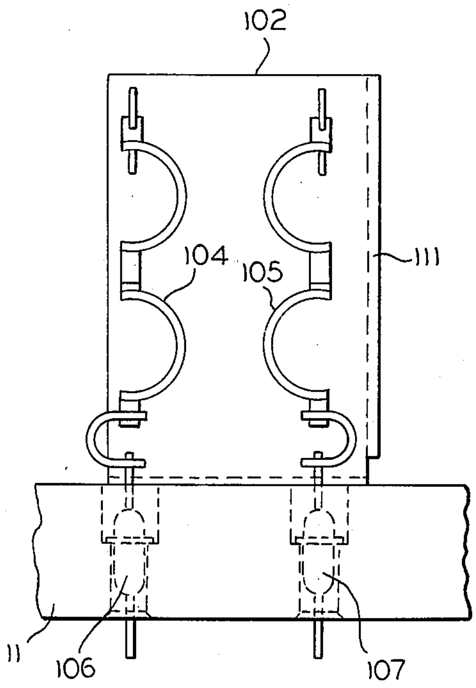
FIG. 12 shows a getter assembly used in the detector.

The detector assembly is also provided with a pair of getter brackets 102 and 103, see FIG. 5, one of which, 102, is shown in detail in FIG. 12. The getter brackets are metal which serves as a connecting link between getter wires 104 and 105, for example, which have their ends connected to getter lead-throughs 106 and 107. After assembly, and after the body 10 has been evacuated, current is conducted by means of feed-throughs 106 and 107 through getter wires 104 and 105 to vaporize them so as to absorb any unwanted gas which may remain in the detector assembly. As can be seen in FIG. 5, the getter brackets 102 and 103 are mounted to base 11 with machine screws 110. The brackets have a right angularly extending leg 111 to which the opposite ends of the cell supporting strip 79 may be spot welded to augment the support for the array of cells which is obtained by spot welding the strip to brackets 94 and fastening the feet 95 of the brackets to base 11.

Figure 3:
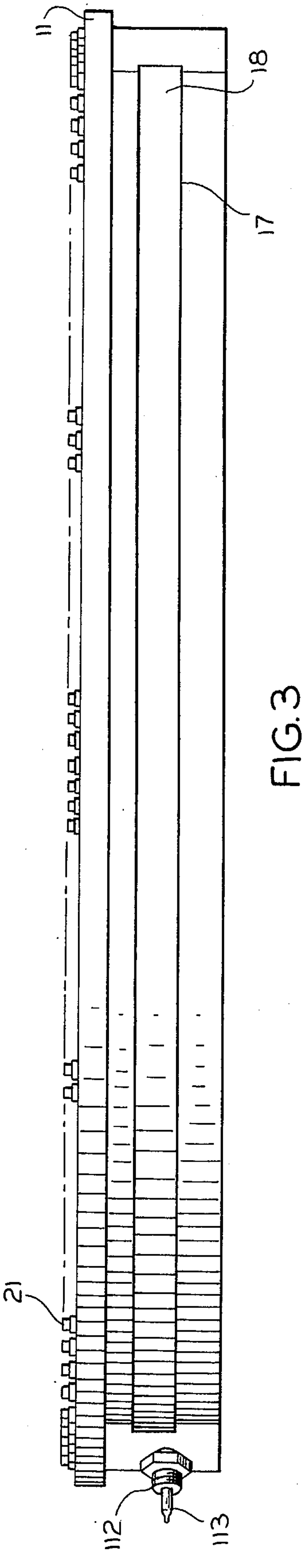
FIG. 3 is a front elevation view of the detector shown in the preceding figures.

When the array of cells are mounted on base 11 as in FIG. 5, the base 11 is then positioned on the open top of the channeled body 10 prior to which a soft copper wire gasket 23 is placed between base 11 and body 10. A plurality of machine screws 21 are then inserted through holes 23 in the base and the base is tightened down to make the assembly gas and vacuum tight. The chamber or body 10 is then evacuated, gettered and subsequently filled with ionizing gas. The connector for coupling the detector to a vacuum pump or gas source is marked 112 in FIG. 3. It will be seen to comprise a conventional glass pinch-off tube 113 which is pinched off to effect a seal after the ionizing gas is admitted. The protective cap for the pinch-off is not shown.

Figure 15:
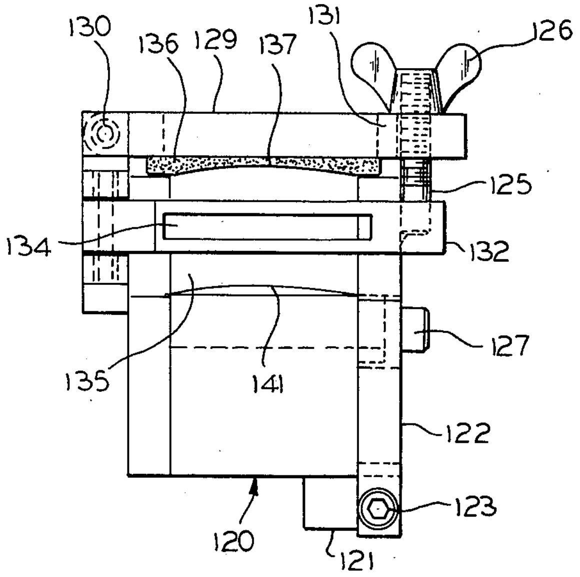
FIGS. 15 and 16 are front and side elevation views, respectively, of a jig for forming an electrode subassembly.
Figure 16:
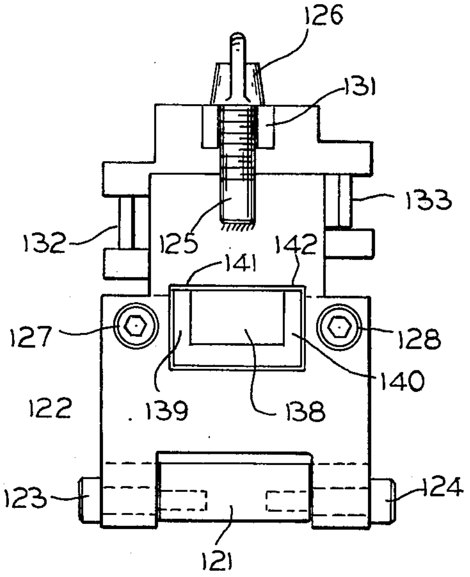

FIGS. 15 and 16 are side and front elevation views of a suitable jig for forming a group of electrode plates into a subassembly or block. The jig comprises a base 120. The base has an extension 121. A front gate 122 is pivotally mounted on extension 121 by means of pins 123 and 124. The upper end of gate 122 has a threaded stud 125 welded to it. A wing nut 126 is provided to lock the gate. A pair of socket headed cap screws 127 and 128 are shown passing through gate 122 and threading into body 120. These screws must be removed to permit gate 122 to swing open and allow insertion of the electrode plates which comprise a block into the die. When an assembly is complete, gate 122 is swung closed as shown and screws 127 and 128 are used to apply pressure, through the agency of the gate, to the electrode stack, thus causing the viscous bonding material to flow properly and the plates to have the proper spacing and the stack to have the proper overall height.

The die is also provided with a top gate 129 which, when wing nut 126 is removed, may be swung upwardly on a pivot 130. The free end of top gate 129 has a slot 131 for allowing stud 125 to enter. Mounted on vertical axes from the back of the body are side gates 132 and 133. Side gate 132 has a rectangular opening 134 which allows the top tabs such as 53 of the electrodes to extend outwardly and to be held in alignment when there is a stack of electrodes within the die.

The stack of electrodes occupies a space 135 in the die. A pressure pad 136 is fastened to top gate 129. It has a curved face 137 which bears on the edges of an electrode stack to assist in forming its curvature as required in the detector heretofore described. Pressure pad 136 may be a commercially available material called Viton. It is a vacuum gasket material which resists high temperature. In one embodiment, Viton having a stiffness of 60 durometer was used.

The upper surface of base 120 has a cavity 138 defined by vertical walls 139 and 140. The cavity has laterally extending shoulders 141 and 142, as can be seen in FIG. 16, which are curved longitudinally as can be seen in FIG. 15 where one of the shoulders is marked 141.

Figure 17:
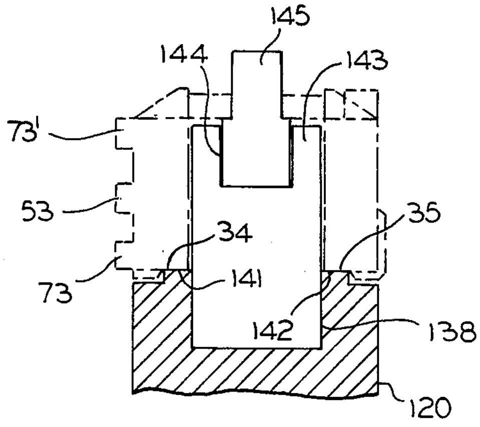
FIG. 17 is a portion of the jig with an electrode subassembly shown in phantom lines.

As mentioned earlier, guard electrodes 44 and 45 have end notches 34 and 35, see FIG. 9. When in the die, these notches bear on shoulders 141 and 142 as illustrated in FIG. 17 where an assembly of electrodes plates such as the stack shown in FIG. 8 is shown in phantom lines. In this way, the edges 34 and 35 of the guard electrodes are compelled to lie in the same plane as the edges of the other electrode plates such as 42 and 43. This assures that the edges of all of the active electrode plates will be at a uniform distance from the x-ray permeable window 18 when the detector is assembled as can be seen in FIG. 11.

FIG. 17 also illustrates how separators or spacers 143 are disposed between the electrode plates to establish proper spacing when the assembly is compressed in the die. Spacers 143 have slots 144 which receive a wedge shaped spacer 145 which puts the electrode plates on radii that emanate from a common point.

As explained earlier, when the plate elements comprising an electrode stack have the uncured viscous material applied to them, they are deposited in the die and clamped with the gates. Final compression is established by tightening screws 127 and 128. The entire die and electrode subassembly are then put in an oven for heat curing.

Although a detector having planar and angularly disposed electrode pulses has been used to illustrate the principles of using viscous adhesive to achieve and maintain desired dimensions in detector cells and in an array of cells, it should be evident from the foregoing description that the principles may also be employed in detectors that use curved electrode plates and, indeed, even in detectors that use stacks of electrodes which have complex and irregular configurations. Accordingly, the scope of the invention should not be limited by the description of the illustrative embodiment but only by construing the claims which follow.

It is claimed:

1. A radiation detector comprising:

means having walls defining a cavity for being filled with ionizable gas, radiation permeable window means disposed in one of said walls, a plurality of spaced apart conductive electrode members and insulating members interposed between said conductive electrode members and all of said members being arranged adjacent each other in a predetermined order in said cavity, some of said electrode members cooperating with adjacent electrode members to define gas filled ionization cells, said cells being arranged for radiation that passes through said window to enter said cells, adhesive material disposed between and on selected adjacent portions of said members, said adhesive material being deposited on limited areas of said members and with sufficient thickness to space said members nonuniformly initially, said adhesive material having the property of yielding when said members are arranged and subjected to compression to thereby establish the desired total thickness and interspacing dimensions of said plurality of members and having the property of subsequently solidifying to bond said members together and thereby maintain said dimensions.

2. The detector as in claim 1 wherein said adhesive material has the characteristic of solidifying when subjected to heat.

3. The detector as in claim 1 wherein said adhesive material is heat curable epoxy resin.

4. A radiation detector comprising:

a stack of adjacent interfacing plate means including electrode plates having front and rear edges and insulating plates selectively disposed between said electrode plates, the size of said insulating plates being less than predetermined ones of said electrode plates so that said insulating plates contribute to creating a gap between said predetermined plates, adhesive material disposed between and on nominally contacting portions of said plates, said adhesive material being deposited on limited areas of said plates and with sufficient thickness to space said plates nonuniformly initially, said adhesive material having the property of yielding when said plates are adjacent each other and subjected to compression to thereby establish the desired interspacing and total thickness dimensions of said plurality of plate means and having the property of solidifying to bond said plate means together and maintain said dimensions, means having walls defining a cavity for being filled with ionizable gas, and a radiation permeable window disposed in one of said walls, said stack of plates being supported in said cavity with said front edges of said predetermined electrode plates disposed along said window and adjacent said window to enable radiation passing through said window to enter the gas filled gaps between said plates.

5. The detector as in claim 4 wherein said adhesive material has the characteristic of solidifying when subjected to heat.

6. The detector as in claim 4 wherein said adhesive material is heat curable epoxy resin.

7. A multi-cell radiation detector comprising:

body means having walls defining a cavity and adapted for being filled with ionizable gas, radiation permeable window means disposed in one of said walls, an array of radiation detecting cells for being disposed in said cavity adjacent said window, said cells each including juxtaposed first and second metallic electrode plates having a gap between them and selectively arranged insulating plates and third metallic plates disposed between said first and second electrode plates to create said gap, said third plates being insulated from said first and second plates, said first and second plates being directed toward said window to enable radiation permeating said window to pass between said first and second plates, adhesive material disposed selectively between said plates for bonding said plates of a cell and adjacent cells together to form said array, at least some of said third plates having support means which are engageable to support said array in said body while maintaining said first and second electrode plates in electrically isolated relationship relative to said body, and means for making electrical connections between said first and second electrodes within said body to the outside thereof.

8. The detector as in claim 7 including:

base means constructed and arranged for being engageable on said body and means mounted to said base means for engaging with said support means to thereby support said array of cells from said base means.

9. The detector as in claim 7 wherein:

said base means comprises a cover for said cavity.

10. The detector as in claim 8 wherein:

said base means comprises a cover, said cover having a surface adapted for being disposed on said body to enclose said body, gasket means interposed between said cover and body, and means for pressing said cover onto said body to effect a seal therewith.

11. The detector as in claim 10 wherein said gasket means is a closed loop of soft copper wire.

12. The detector as in claim 7 wherein:

said first and second electrode plates have corresponding edges which are spaced from said walls of said body adjacent said window when said array of cells is disposed in said cavity, at least some of said third plates having portions extending therefrom beyond said edges and into contact relationships with said wall means to thereby provide further support for said array in said cavity.

13. The detector as in claim 7 wherein the thickness and distribution of said adhesive material is such that said plate means are angulated on radii, respectively, emanating from a substantially common point.

14. The detector as in claim 7 wherein the thickness and distribution of said adhesive material is such that said array of cells has a curvature and said first and second plates of each cell define the same acute angle between them.

15. The detector as in claim 7 wherein the thickness and distribution of said adhesive material is such that the first and second electrode plates of all in said array of cells are in substantial parallelism with each other.

16. A radiation detector comprising:

a body having walls defining an elongated cavity, a radiation permeable window in one of said walls, cover means engageable with said body to sealingly enclose said cavity for containing ionizable gas, said cover having a plurality of electric lead-throughs therein, an array of radiation detector cells and means for mounting said array on said cover means for being disposed adjacent said window in said cavity when said cover means is engaged, said cells in said array comprising:

juxtaposed first and second electrode plates having a gap between them and selectively arranged insulating plates and third metallic plates disposed between said first and second plates to create said gap, said first and second plates having edges for being disposed adjacent said window and said plates being directed toward said window to enable radiation permeating said window to pass into said gap, adhesive material disposed selectively between said plates for bonding said plates of a cell and adjacent cells together to form said array and compensate for thickness variations in said plates, and lead-through means in said cover means for making electrical connections between said first and second electrode plates inside of said body to the outside thereof.

17. The detector as in claim 16 wherein:

said means for mounting said array to said cover means comprises means fastened to said cover means and engaged only with predetermined ones of said third plate means while remaining in electrical isolation from said first and second electrode plate means due to said interposed insulating plates.

18. The detector as in claim 16 wherein said third plate means are characterized as guard electrodes disposed between opposed insulating plates in each cell and said insulating plates in each cell and said insulating plates being disposed between opposed first and second electrode plates in each cell, said guard electrodes being for operating at the same potential as said body of said detector, certain of said guard electrodes having foot means integral therewith and extending therefrom, metallic strip means substantially coextensive with said array of cells and disposed on a side thereof opposite of said window, said foot means being fastened to said stop means and said strip means being mounted to said cover means to provide means for mounting said array to said cover means.

19. The detector as in claim 18 wherein:

at least some of said guard electrode plate means have portions extending beyond the edges of said first and second electrodes which are adjacent said window means, said portions making contact with said wall means to thereby further support said array in said cavity.

20. The detector as in claim 16 wherein:

said cavity is a curved channel of sufficient length to accommodate said array and the amount and distribution of said adhesive material is such as to dispose the plates of said cells at similar acute angles to produce a curve in said array wherein said plates coincide with radii emanating substantially from a common point.

21. The detector as in claim 16 wherein said cavity is filled with the ionizable gas xenon at least 25 atmospheres of pressure.

22. A method of making a multi-cell radiation detector comprising the steps of:

selecting metallic electrode members and insulating members which are to be arranged in nominal contacting relation to form a cell, depositing viscous and yieldable adhesive material on selected areas of said electrodes and insulating members which are intended to interface, stacking said members for said viscous material to engage, pressing the stack so formed to cause said viscous material to flow until the desired overall thickness of the stack is obtained, allowing said viscous material to solidify to thereby bond said members together, anchoring said stack of bonded members in a container which has a radiation permeable window for allowing radiation to enter the cells, and filling said container with ionizable gas.

23. A method of making a multi-cell detector array which is comprised of a stack of metallic plates and insulating plates between them wherein it is desired to establish accurately the overall thickness dimension of the stack, comprising the steps of:

depositing viscous and yieldable adhesive material to selected portions of plates which constitute a cell, stacking said plates of a cell in a form that defines the shape of said stack and that allows said adhesive material to engage said insulating plates and metallic plates, then when a predetermined number of cells have been assembled in said form, pressing the stack of cells to cause said adhesive material to flow and enable said stack to acquire the desired overall thickness dimension of said predetermined number of cells, allowing said viscous material to solidify to thereby bond said cells into a unit, depositing additional viscous and yieldable adhesive material on the ends of a plurality of such units, placing said units adjacent each other in a form and pressing them together to cause said adhesive material between adjacent ends to flow and enable the units to acquire the desired overall thickness dimension of the plurality of units, allowing said viscous material between said units to solidify to thereby bond said units and form a unitary stack of cells, anchoring said unitary stack of cells in a container which has a radiation permeable window for allowing radiation to enter said cells, and filling said container with ionizable gas.

* * * * *